United States Patent
Kim et al.

(10) Patent No.: US 10,833,539 B2
(45) Date of Patent: Nov. 10, 2020

(54) MOBILE TERMINAL, COMMUNICATIONS MODULE AND CONTROL METHOD OF MOBILE TERMINAL

(71) Applicant: WITS Co., Ltd., Yongin-si (KR)

(72) Inventors: Ji Hoon Kim, Suwon-si (KR); Tae Seok Ko, Suwon-si (KR); Dong Yeol Lee, Suwon-si (KR); Ju Hyoung Park, Suwon-si (KR); Sang Beom Lee, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 219 days.

(21) Appl. No.: 16/014,211

(22) Filed: Jun. 21, 2018

(65) Prior Publication Data

US 2019/0097468 A1 Mar. 28, 2019

(30) Foreign Application Priority Data

Sep. 27, 2017 (KR) .................. 10-2017-0125163
Jan. 29, 2018 (KR) .................. 10-2018-0010508

(51) Int. Cl.
| | |
|---|---|
| *H02J 50/60* | (2016.01) |
| *G06K 7/10* | (2006.01) |
| *H04W 52/02* | (2009.01) |
| *H02J 50/80* | (2016.01) |
| *H02J 50/12* | (2016.01) |

(52) U.S. Cl.
CPC ................ *H02J 50/60* (2016.02); *G06K 7/10* (2013.01); *G06K 7/10128* (2013.01); *H02J 50/12* (2016.02); *H02J 50/80* (2016.02); *H04W 52/0229* (2013.01)

(58) Field of Classification Search
CPC ............ H02J 50/60; H02J 50/80; H02J 50/12; G06K 7/10; G06K 7/10128; H04W 52/0229
See application file for complete search history.

(56) References Cited

U.S. PATENT DOCUMENTS

| | | | |
|---|---|---|---|
| 2018/0097408 A1* | 4/2018 | Oh .................... | H02J 50/12 |
| 2018/0152050 A1* | 5/2018 | Ko .................... | H02J 50/12 |
| 2018/0205269 A1* | 7/2018 | Han .................. | H02J 7/025 |
| 2019/0190320 A1* | 6/2019 | Park .................. | H02J 7/02 |

FOREIGN PATENT DOCUMENTS

| | | |
|---|---|---|
| JP | 5656698 B2 | 1/2015 |
| KR | 10-2014-0087526 A | 7/2014 |
| KR | 10-2016-0041473 A | 4/2016 |

* cited by examiner

*Primary Examiner* — Jared Fureman
*Assistant Examiner* — Duc M Pham
(74) *Attorney, Agent, or Firm* — Harness, Dickey & Pierce, P.L.C.

(57) ABSTRACT

A mobile terminal includes a communication controller configured to detect a wireless tag in a mobile environment and a wireless charging controller configured to receive power wirelessly, and control the communication controller to determine whether the wireless tag is in the mobile environment, in response to receiving a wake-up power signal from a wireless power transfer apparatus.

19 Claims, 12 Drawing Sheets

MOBILE TERMINAL, COMMUNICATIONS MODULE AND CONTROL METHOD OF MOBILE TERMINAL

CROSS-REFERENCE TO RELATED APPLICATIONS

This application claims the benefit under 35 USC 119(a) of Korean Patent Application Nos. 10-2017-0125163 and 10-2018-0010508 filed on Sep. 27, 2017 and Jan. 29, 2018 respectively, in the Korean Intellectual Property Office, the entire disclosures of which are incorporated herein by reference for all purposes.

BACKGROUND

1. Field

The present disclosure relates to a mobile terminal, a communications module, and a control method of the mobile terminal.

2. Description of Related Art

Recent developments of wireless technology allow the transfer of power in addition to the transfer of data. Wireless power transfer technology, which charges an electronic device with electric power, even in a contactless state, has been developed.

Such wireless power transfer technology transfers high voltages in a wireless manner. Accordingly, when there are foreign objects, such as a wireless tag or a radio frequency (RF) card, other than objects to be charged within a wireless charging environment, the foreign objects may be damaged due to the high voltage.

The above information is presented as background information only to assist with an understanding of the present disclosure. No determination has been made, and no assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a mobile terminal includes a communication controller configured to detect a wireless tag in a mobile environment, and a wireless charging controller configured to receive power wirelessly, and control the communication controller to determine whether the wireless tag is in the mobile environment, in response to receiving a wake-up power signal from a wireless power transfer apparatus.

The communication controller is further configured to control the wireless charging controller to inhibit receipt of wireless power when the wireless tag is detected.

The communication controller is further configured to request the wireless charging controller to receive wireless power, and terminate an operation of the communication controller in response to the wireless tag not being detected.

The wireless charging controller is further configured to perform a procedure for wireless power reception in response to information regarding a detection of the wireless tag not being received from the communication controller within a predetermined time.

The mobile terminal further includes a power management controller configured to supply power to the communication controller, wherein the wireless charging controller is further configured to wake up the power management controller in response to receiving the wake-up power signal from the wireless power transfer apparatus.

The wireless charging controller is further configured to control the power management controller to provide operating power to the communication controller in response receiving the wake-up power signal from the wireless power transfer apparatus.

The mobile terminal further includes an application controller configured to control an operation of either one or both of the communication controller and the wireless charging controller.

The wireless charging controller is further configured to control the power management controller to provide operating power to the application controller in response to receiving the wake-up power signal from the wireless power transfer apparatus.

The power management controller is further configured to supply operating power to the application controller and the wireless charging controller, in response to being woken up.

The communication controller comprises an input terminal configured to receive either one or both of an enable signal and an inhibit signal from the wireless charging controller, and the wireless charging controller is further configured to transmit the enable signal to the communication controller in response to receiving the wake-up power signal from the wireless power transfer apparatus.

The wireless charging controller comprises an input terminal configured to receive either one or both of an enable signal and an inhibit signal from the communication controller, and the communication controller is further configured to provide the inhibit signal to the input terminal in response to the wireless tag being detected.

In another general aspect, a communications module includes a module substrate, a communication controller provided on the module substrate and electrically connected to a communications coil, the communication controller being configured to detect a wireless tag, and a wireless charging controller provided on the module substrate and electrically connected to a power receiving coil to receive power wirelessly, wherein the communication controller and the wireless charging controller are configured to provide control signals to each other through conductive lines formed between the communication controller and the wireless charging controller.

In another general aspect, a control method of a mobile terminal performed by a wireless charging controller includes receiving wake-up power from a wireless power transfer apparatus, waking up the wireless charging controller in response to the receiving of the wake-up power, and requesting that a communication controller in the mobile terminal determine whether a wireless tag is in an environment of the mobile terminal.

The control method further includes inhibiting an operation of receiving wireless power in response to the communication controller determining that the wireless tag is in the environment of the mobile terminal.

The control method further includes continuing an operation of receiving wireless power in response to the communication controller determining that the wireless tag is not in the environment of the mobile terminal.

The continuing of the operation of receiving the wireless power includes waking up an application controller located in the mobile terminal, and receiving power transferred from the wireless power transfer apparatus by performing a coupling operation with the application controller.

In another general aspect, a mobile terminal includes a communication controller configured to recognize a wireless tag based on signals from a communications coil, a wireless charging controller configured to receive power wirelessly from a wireless power transfer apparatus via a power receiving coil, and output a wired wake-up power signal in response to receiving a wireless wake-up power signal from the wireless power transfer apparatus, and an auxiliary controller configured to control the communication controller to determine whether the wireless tag is located in an environment of the mobile terminal in response to receiving the wired wake-up power signal from the wireless charging controller.

The wireless wake-up power signal is a digital ping signal, and the auxiliary controller is further configured to control the communication controller to determine whether the wireless tag is in the environment of the mobile terminal before the wireless power transfer apparatus determines an identity of the mobile terminal and a required power demand for the mobile terminal.

The auxiliary controller includes a power management controller configured to receive the wired wake-up power signal and output a first operating power and a second operating power, and an application controller configured to operate in response to receiving the first operating power, and wherein the communication controller is further configured to detect whether the wireless tag is in an environment of the mobile terminal, in response to the second operating power.

The auxiliary controller includes a power management controller configured to receive the wired wake-up power and output a first operating power; and an application controller configured to operate in response to receiving the first operating power, and wherein the application controller is configured to output an enable signal in response to the first operating power, and the communication controller is configured to detect whether the wireless tag is in an environment of the mobile terminal in response to the enable signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
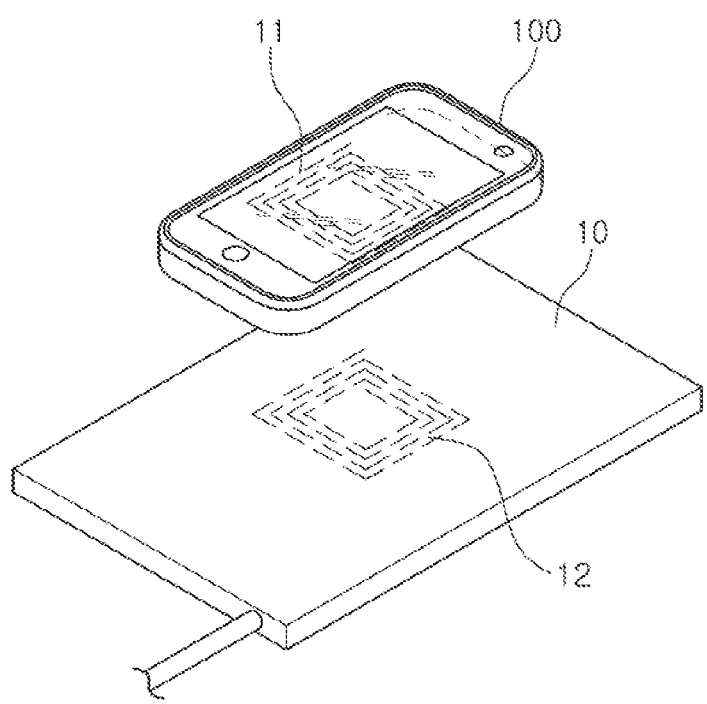
FIG. 1A is a diagram illustrating an example of an application of a mobile terminal.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

It is noted that use of the term "may" with respect to an example or embodiment, e.g., as to what an example or embodiment may include or implement, means that at least one example or embodiment exists where such a feature is included or implemented while all examples and embodiments are not limited thereto.

FIG. 1A is a diagram illustrating an example of an application of a mobile terminal according to an example.

In FIG. 1A, a wireless power transfer apparatus 10 may wirelessly transfer power via a transmitting coil 12 to a receiving coil 11 of a mobile terminal 100. In other words, for example, the wireless power transfer apparatus 10 may include a transmitting coil 12, and the transmitting coil 12 may be magnetically coupled to the receiving coil 11 to wirelessly transfer power to the mobile terminal 100.

The receiving coil 11 may be coupled to the mobile terminal 100 or may be integrated with the mobile terminal 100, and a battery of the mobile terminal 100 may be charged based on the power transferred from the wireless power transfer apparatus 10.

Figure 1B:
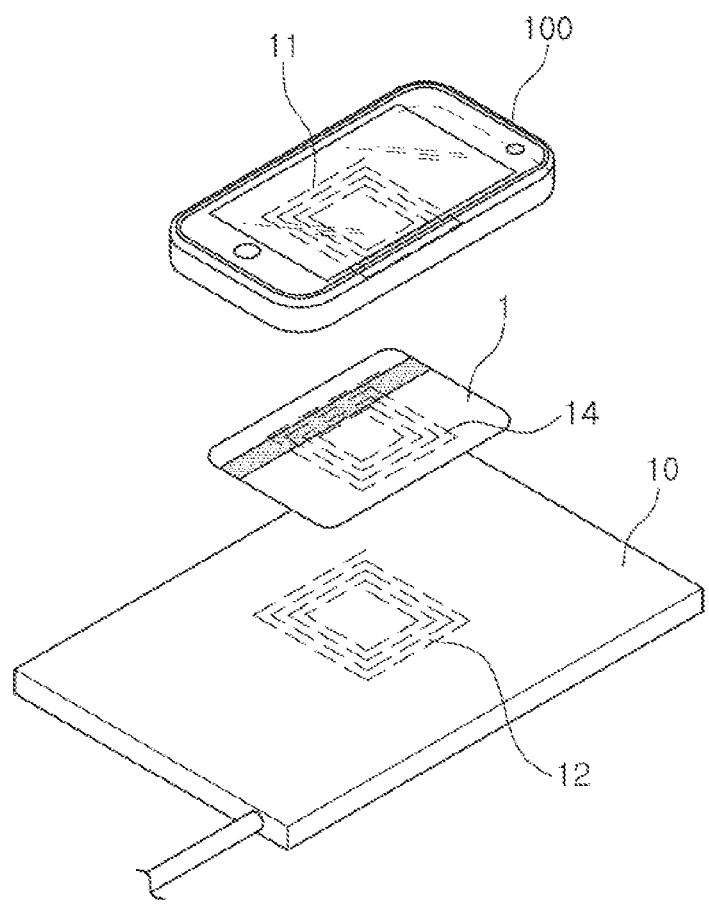
FIG. 1B is a diagram illustrating an example of an application of a mobile terminal.

FIG. 1B is a diagram illustrating an example of the application of a mobile terminal 100.

In the example shown in FIG. 1B, there may be a wireless tag 1 adjacent to the wireless power transfer apparatus 10 in addition to the mobile terminal 100.

In FIG. 1B, although the respective components are shown as being spaced apart from each other in a vertical direction to be easily identified, this is merely an example. The mobile terminal 100 or the wireless tag 1 may be placed on the wireless power transfer apparatus 10.

The wireless tag 1 may be provided with a coil 14 for performing wireless communications or for receiving power. In the example shown, the wireless tag 1 may be a magnetic card that performs contactless communications. However, this is only an example. The wireless tag 1 may be various wireless tags such as a near field communication (NFC) card and a radio frequency identification (RFID) tag.

As shown in FIG. 1B, when there is another external object (e.g., the wireless tag 1) along with the mobile terminal 100 in the charging field or charging environment of the wireless power transfer apparatus 10, if the wireless power transfer apparatus 10 wirelessly transfers power to the mobile terminal 100 without recognizing the presence of the external object, the external object may be damaged by a magnetic field formed for power transfer, or the wireless charging process may be interrupted. Accordingly, external objects such as the wireless tag 1 that are within the charging environment of the wireless power transfer apparatus 10 should be detected prior to the wireless charging being performed.

According to an example, the wireless tag 1 may be positively detected in the mobile terminal 100 prior to the commencement of a charging operation by the wireless power transfer apparatus 10, and the wireless charging operation may not be performed when the wireless tag 1 or any other foreign object is detected.

Additionally, according to an example, the wireless charging by the wireless power transfer apparatus 10 may be interrupted prior to a charging operation of the mobile terminal 100 being completed in order to reduce or prevent any damage to the wireless tag 1 by detecting the wireless tag 1 and interrupting the wireless charging operation without the intervention of an application controller, that is, an application processor (AP) which is a main control circuit of the mobile terminal 100.

Hereinafter, each phase of the wireless charging will be described with reference to FIGS. 2 and 3A and 3B.

Figure 2:
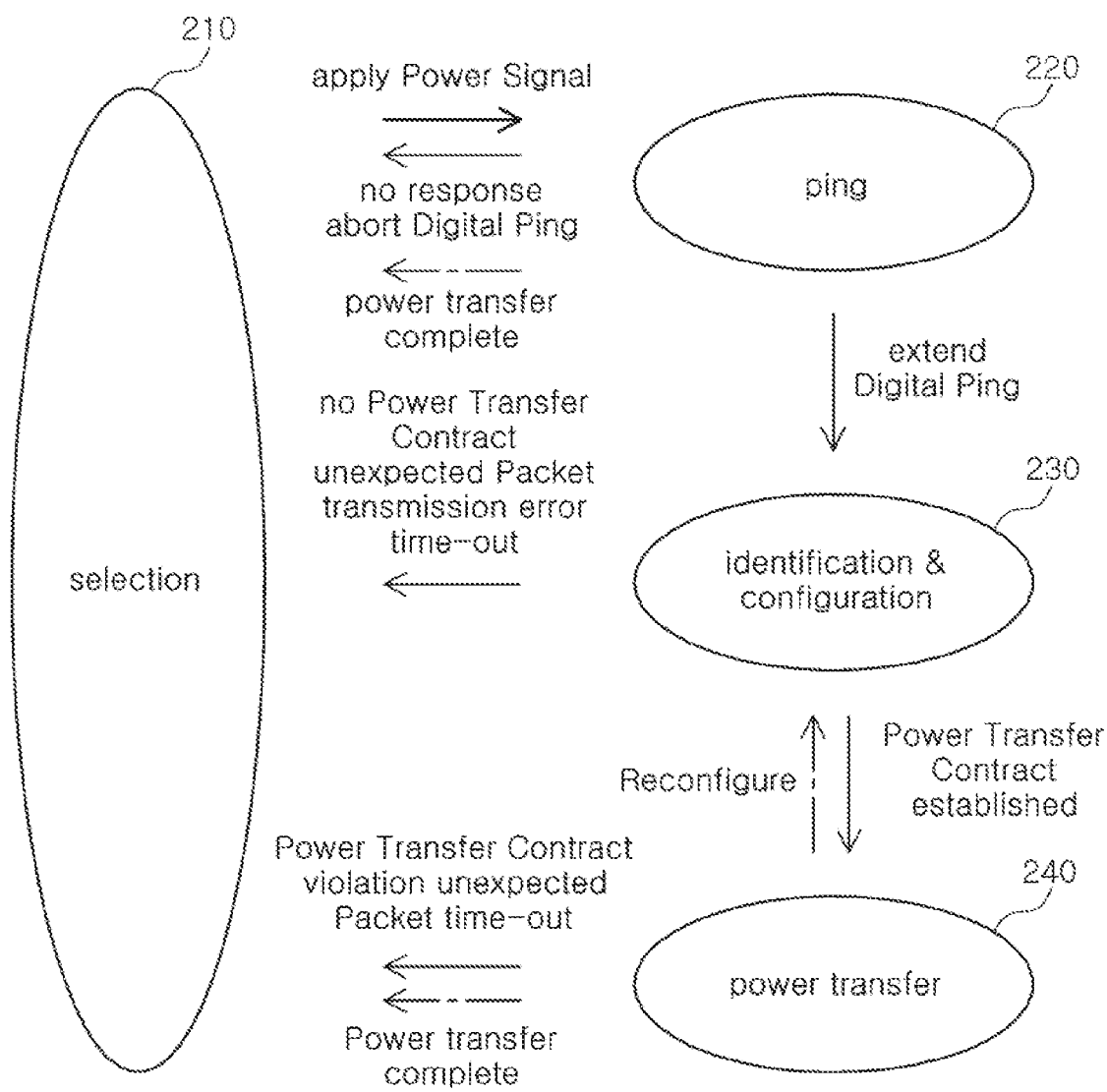
FIG. 2 is a diagram illustrating an example of each phase for performing power transfer, according to an example of wireless charging.

FIG. 2 is a diagram illustrating each phase for performing power transfer, according to an example of wireless charging.

First, a selection phase 210 may be performed. In the selection phase 210, the wireless power transfer apparatus 10 may transfer an external device detection signal, such as a short beacon signal.

The wireless power transfer apparatus 10 may determine that a specific external object is located in the vicinity of the wireless power transfer apparatus 10 when a change (e.g., a change in impedance) in the external device detection signal occurs.

If it is determined that the predetermined external object is adjacent to the wireless power transfer apparatus 10 in the selection phase 210, the wireless power transfer apparatus 10 may determine whether the detected external object is the mobile terminal 100 by transmitting, in a ping phase 220, a ping signal (e.g., a long beacon signal).

The ping signal may wake-up a wireless charging controller 120 (shown in FIG. 4) of the mobile terminal 100. Accordingly, the ping signal serves as a signal to wake up the wireless charging controller 120 (shown in FIG. 4).

After the wireless charging controller 120 (shown in FIG. 4) is pinged to determine whether the wireless tag 1 is located in the vicinity of the wireless charging controller 120, if a determination is made that the wireless tag 1 or other external objects are not in the vicinity or environment of the wireless power transfer apparatus 10, the wireless charging controller 120 may wake up the application controller 140 (shown in FIG. 4) and then interlock with the application controller 140 (shown in FIG. 4) to perform the wireless charging. The wireless charging controller 140 (shown in FIG. 4) may be operated to determine whether the wireless tag 1 is present, thereby detecting the wireless tag 1 or any other foreign object prior to a period when wireless power is transferred from the wireless power transfer apparatus 10 without intervention by the application controller 140.

Figure 4:
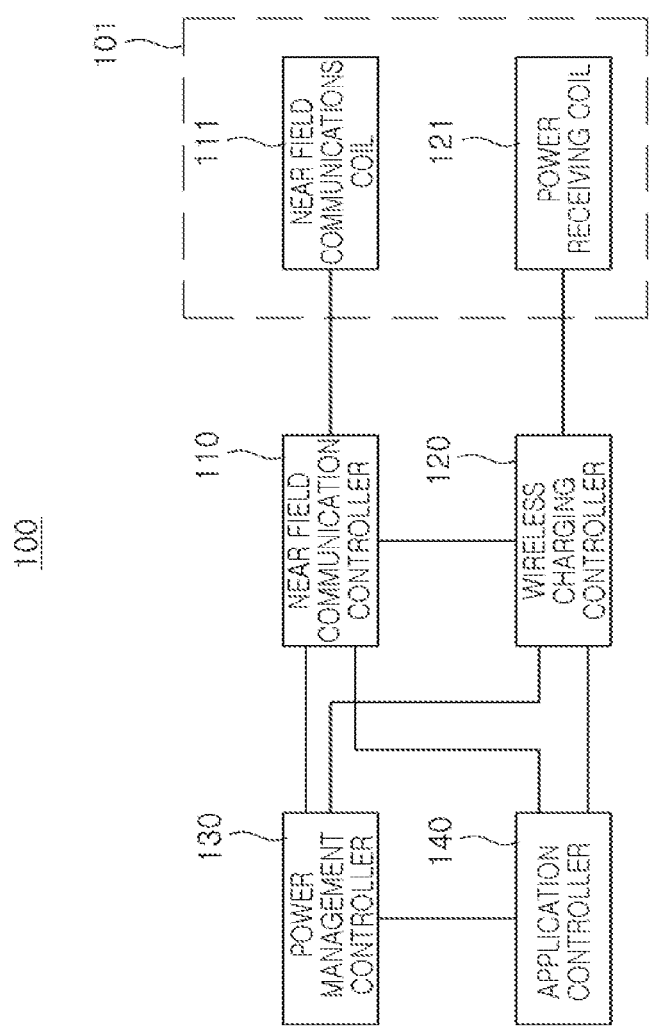
FIG. 4 is a block configuration diagram illustrating an example of a mobile terminal.

Alternatively, the wireless charging controller 120 (shown in FIG. 4) may be operated to indirectly identify whether the wireless tag 1 is present based on a power management controller 130 (shown in FIG. 4) or the application controller 140 (shown in FIG. 4). This operation or structure may be applied in an example where the wireless charging controller 120 (shown in FIG. 4) may not be operable to directly determine whether the wireless tag 1 is present.

For example, the mobile terminal 100 may transmit a response signal to the ping signal transmitted by the wireless power transfer apparatus 10. The response signal may include at least one of signal strength information, information regarding the type of the wireless power receiving apparatus, information regarding the required power, and information regarding the voltage, but is not limited thereto.

The wireless power transfer apparatus 10 may determine the identity of the mobile terminal 100 to be charged and the power demand for the identified mobile terminal 100 based on the response signal of the mobile terminal 100 to the ping signal, in the identification & configuration phase 230.

Thereafter, the wireless power transfer apparatus 10 may wirelessly provide power to the mobile terminal 100 in response to the determined information, in the power transfer phase 240.

As described above, the wireless power transfer apparatus 10 and the mobile terminal 100 may wirelessly transfer power by sequentially performing the selection phase 210, the ping phase 220, the identification and configuration phase 230, and the power transfer phase 240.

Figure 3:
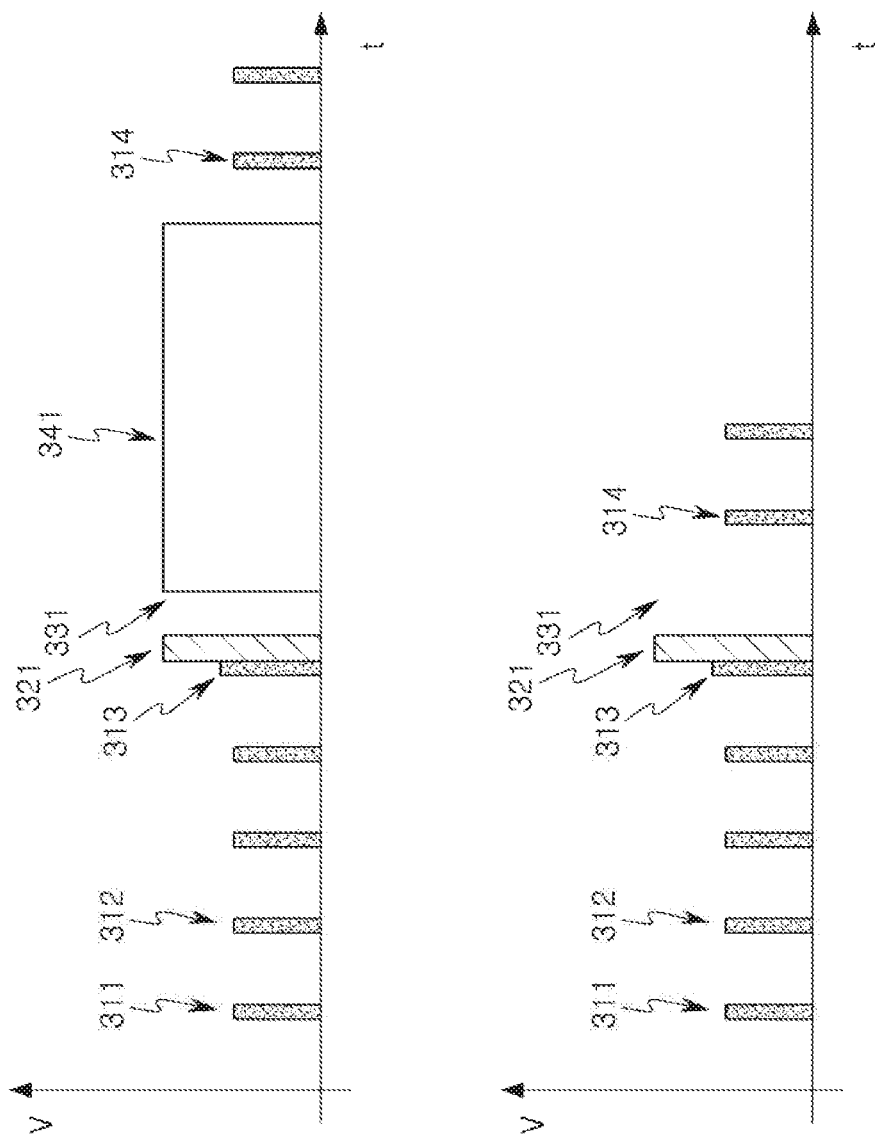
FIGS. 3A and 3B are diagrams illustrating examples of signals transferred from a wireless power transfer apparatus.

FIGS. 3A and 3B are diagrams illustrating an example of signals transferred from a wireless power transfer apparatus. For explanation purposes the wireless power transfer apparatus and the mobile terminal will be discussed with reference to the wireless power transfer apparatus and the mobile terminal of FIGS. 1A and 1B. However, the disclosure is not limited to the examples of FIGS. 1A and 1B.

Referring to FIGS. 3A and 3B, the wireless power transfer apparatus 10 may periodically transmit short beacon signals 311 and 312 for detecting the mobile terminal 100.

If a change in any one 313 of the short beacon signals is detected, the wireless power transfer apparatus 10 may transmit a long beacon signal 321 to determine whether a detected external object is the mobile terminal 100.

The wireless charging controller 120 (shown in FIG. 4) of the mobile terminal 100 may be woken up by the long beacon signal. That is, since the long beacon signal 321 transfers sufficient power, the wireless charging controller 120 (shown in FIG. 4) of the mobile terminal 100 may use the long beacon signal 321 as wake-up power to be woken up.

The mobile terminal 100 may perform an operation of determining whether a wireless tag 1 is present in the vicinity or environment of the mobile terminal 100 (S331). That is, the mobile terminal 100 may determine whether a wireless tag 1 or another foreign object is located in the vicinity or environment of the mobile terminal 100 before the power transfer (341) is performed (S331), after the long beacon signal 321 is received.

If a wireless tag 1 or another foreign object is not located in the vicinity or environment of the mobile terminal 100, as shown in FIG. 3A, the mobile terminal 100 may receive power from the wireless power transfer apparatus 10 by interlocking or establishing a coupling operation with the wireless power transfer apparatus 10 (341). In other words, in an example, if a determination is made that a wireless tag or other foreign object is not located in the environment of the mobile terminal, a coupling operation is established between the transmitting coil 12 of the wireless power transfer apparatus 10 and the receiving coil 11 of the mobile terminal 100. The coupling includes, but is not limited to, inductive coupling, capacitive coupling, and resonant inductive coupling. If the power reception is completed, the wireless power transfer apparatus 10 may repeatedly transmit the short beacon signal again (S314).

On the other hand, if a wireless tag 1 is detected in the vicinity or environment of the mobile terminal 100, as shown in FIG. 3B, the mobile terminal 100 may stop the operation for the wireless charging, such that the wireless power transfer may be canceled. As a result, the wireless power transfer apparatus 10 may repeatedly transmit the short beacon signal again (S314).

In the above description, the example which performs the wireless charging while preventing the wireless tag from being damaged is mainly described with reference to the wireless power transfer phase.

Hereinafter, the mobile terminal according to an example will be described with reference to FIGS. 4 through 7. For explanation purposes the wireless power transfer apparatus and the mobile terminal will be discussed with reference to the wireless power transfer apparatus and the mobile terminal of FIGS. 1A and 1B. Note that examples are not limited thereto.

FIG. 4 is a block configuration diagram illustrating an example of a mobile terminal according to an exemplary embodiment in the present disclosure.

Referring to FIG. 4, in a non-limiting example, the mobile terminal 100 may include a near field communication controller 110, the wireless charging controller 120, the power management controller 130, and the application controller 140. In an example, the combination of the power management controller 130 and the application controller 140 may be an auxiliary controller. The application controller 140 and the application controller 140 may individually control operations of the near field communication controller 110 or the wireless charging controller 120.

According to another non-limiting example, the mobile terminal 100 may further include a near field communications coil 111 connected to the near field communication controller 110 for communicating with the wireless tag 1 and a power receiving coil 121 connected to the wireless charging controller 120 for receiving power wirelessly from the wireless power transfer apparatus 10.

According to the example, the near field communications coil 111 and the power receiving coil 121 may also be separate apparatuses which are connected to, or disconnected from, the mobile terminal 100.

The near field communication controller 110 may recognize the wireless tag 1 with the near field communications coil 111.

The wireless charging controller 120 may receive power wirelessly based on the power receiving coil 121.

When the wireless charging controller 120 receives the wake-up power signal from the wireless power transfer apparatus 10, the wireless charging controller 120 may control the near field communication controller 110 to detect whether a wireless tag 1 is located in the vicinity or environment of the wireless power transfer apparatus 10 or the mobile terminal 100.

For example, the wake-up power signal may be the long beacon signal 321 (FIGS. 3A and 3B) described above, and the wireless charging controller 120 may be woken up from a sleep mode when the wake-up power signal to start an operation is received.

At this time, the wireless charging controller 120 may directly control the near field communication controller 110 or may indirectly control the near field communication controller 110 using the power management controller 130 or the application controller 140. In an example, the direct control of the near field communication controller 110 by the wireless charging controller 120 may be via wired links.

If a wireless tag 1 is detected, the near field communication controller 110 may control the wireless charging controller 120 to inhibit the receipt of wireless power.

If a wireless tag 1 is not detected, the near field communication controller 110 may request the wireless charging controller 120 to receive wireless power. Hereinafter, the near field communication controller 110 may terminate the operation of the near field communication controller 110, that is, may be switched to the sleep mode.

According to the example, if the information regarding the detection of the wireless tag 1 is not received from the near field communication controller 110 within a predetermined time, the wireless charging controller 120 may perform a procedure for wireless power reception. That is, if there is no response from the near field communication controller 110 within a predetermined time, the wireless charging controller 120 may determine that a wireless tag 1 is not located in the vicinity or environment of the mobile terminal 100, and may perform the procedure for wireless power reception.

The power management controller 130 may supply power to the near field communication controller 110 or the application controller 140.

For example, the power management controller 130 may provide operating power to the near field communication controller 110 or the application controller 140 in accordance with the power information (e.g., voltage or current) required by the near field communication controller 110 or the application controller 140.

Accordingly, the power management controller 130 may be connected to the battery of the mobile terminal 100 and may include a means for regulating the voltage or current.

According to the example, the wireless charging controller 120 may wake up the power management controller 130 when the wake-up power signal is received from the wireless power transfer apparatus 10. For example, the wireless charging controller 120 may provide a voltage signal for waking up the power management controller 130 to the power management controller 130 when the wake-up power signal is received from the wireless power transfer apparatus 10. In an example, the wake-up power signal that is transmitted to the power management controller 130 may be transmitted via wired communication links.

According to the example, if the power management controller 130 is woken up, the power management controller 130 may provide the operating power to the near field communication controller 110 or the application controller 140 to wake up the near field communication controller 110 or the application controller 140.

According to the example, when receiving the wake-up power from the wireless power transfer apparatus, the wireless charging controller 120 may control the power management controller 130 to provide the operating power to the near field communication controller 110. The wireless charging controller 120 may control the power management controller 130 via wired communication links.

According to the example, when receiving the wake-up power from the wireless power transfer apparatus, the wireless charging controller 120 may control the power management controller 130 to provide the operating power to the application controller 140.

The application controller 140 may control the operation of the near field communication controller 110 or the wireless charging controller 120. Here, the 'controlling the operation of something' may be an expression including performing a single operation by interlocking or coupling with something (e.g., performing a series of processes for the wireless power reception by interlocking or coupling with the wireless charging controller 120).

According to the example, the near field communication controller 110 may include an input terminal (not shown) for receiving an enable signal or an inhibit signal from the wireless charging controller 120. When receiving the wake-up power signal from the wireless power transfer apparatus 10, the wireless charging controller 120 may provide the enable signal to the near field communication controller 110.

According to the example, the wireless charging controller 120 may include an input terminal (not shown) for receiving an enable signal or an inhibit signal from the near field communication controller 110, and the near field communication controller 110 may provide the inhibit signal to the input terminal when a wireless tag 1 is detected.

In addition to the examples described above, various connection relationships among the plurality of controllers may be possible in the mobile terminal, and FIGS. 5 through 9 are diagrams illustrating various examples of the connection relationships among the plurality of controllers.

Figure 5:
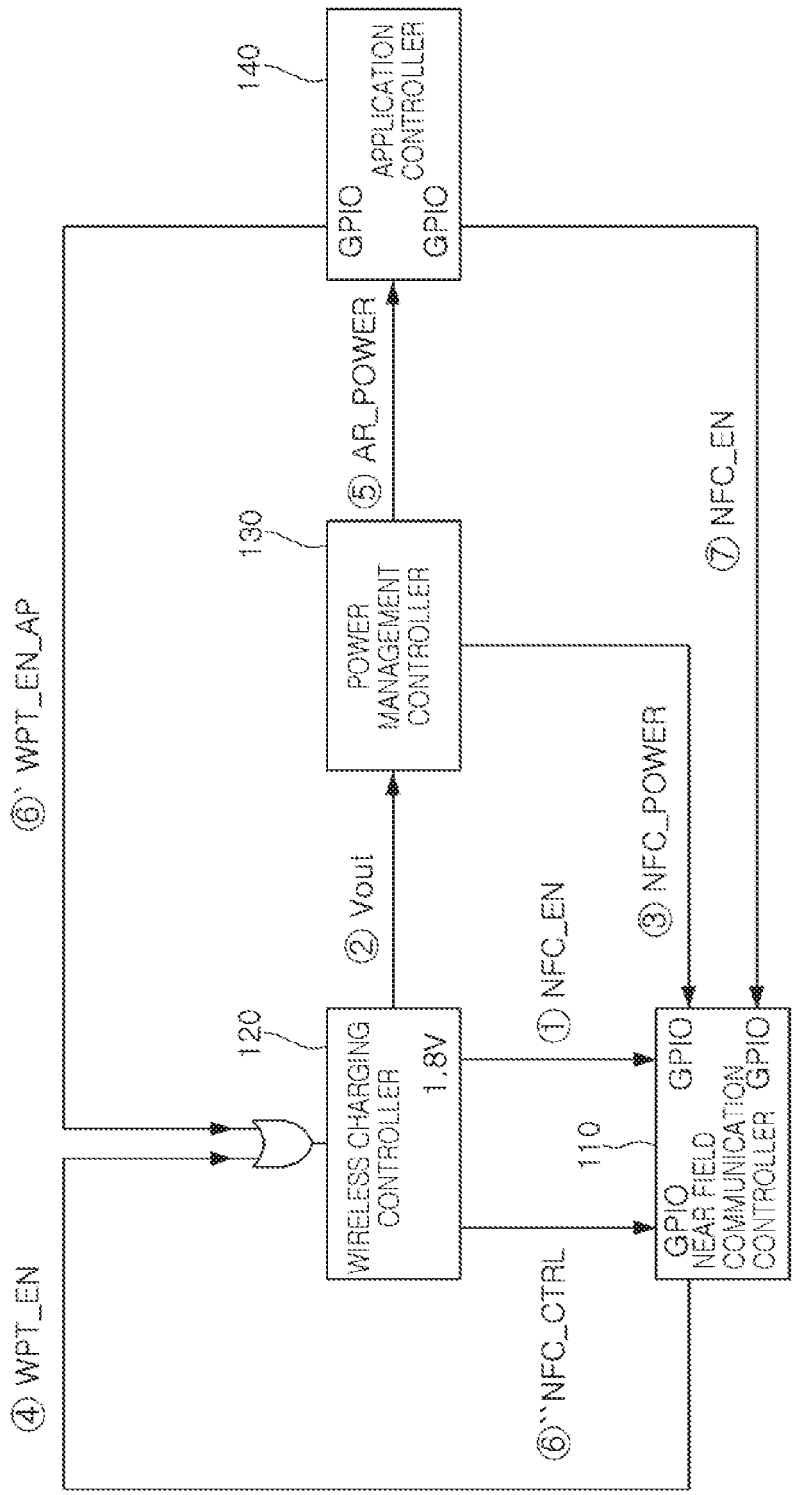
FIG. 5 is an example of a connection relationship diagram illustrating an example of a mobile terminal.

Referring to FIG. 5, when receiving the wake-up power signal from the wireless power transfer apparatus 10, the wireless charging controller 120 may provide an enable signal NFC_EN to the near field communication controller 110 and provide wake-up power Vout to the power management controller 130.

The power management controller 130 may provide the operating power NFC_POWER to the near field communication controller 110 and provide the operating power AP_POWER to the application controller 140.

The near field communication controller 110 may be operated to perform a reading operation for determining whether a wireless tag 1 is located in the vicinity or environment of the mobile terminal 100.

If a wireless tag 1 is present, the near field communication controller 110 may provide the inhibit signal to the wireless charging controller 120.

If a wireless tag 1 is not detected, the near field communication controller 110 may provide the enable signal to the wireless charging controller 120.

In an example, the inhibit signal and the enable signal may be a signal WPT_EN transmitted through the same signal line. That is, the signal WPT_EN in a first state may be the inhibit signal, and the signal WPT_EN in a second state which is a state different from the first state may be the enable signal.

Hereinafter, the near field communication controller 110 may be switched to the sleep mode, and the wireless charging controller 120 and the application controller 140 may interlock with each other to perform the wireless charging operation.

In one example, the application controller 140 may be woken up and then control the operation of the near field communication controller 110. For example, the application controller 140 may provide an enable signal NFC_EN to the near field communication controller 110 to perform a control to use a wireless tag 1 in the mobile environment. If a wireless tag 1 is not detected and thus the wireless charging controller 120 successfully performs the wireless charging procedure, the application controller 140 may acquire a control right for the wireless charging and control the wireless charging with the wireless power transfer apparatus 10. For example, the application controller 140 may provide a control right acquisition signal WPT_EN_AP to the wireless charging controller 120. The control right acquisition signal WPT_EN_AP may be a signal indicating that the woken-up application controller 140 takes the control right of the wireless charging control.

If the control right acquisition signal WPT_EN_AP is input, the wireless charging controller 120 may perform the wireless charging while being operated under the dominant control of the application controller 140.

As described above, the wireless charging controller 120 and the application controller 140 may each provide the enable signal to the near field communication controller 110. For this purpose, the near field communication controller 110 may be controlled through general purpose input outputs (GPIOs) respectively.

According to the example, the wireless charging controller 120 may receive the enable signal from the near field communication controller 110 and the application controller 140 through an OR gate. Accordingly, the wireless charging controller 120 may be required to interpret the signal to identify the control right acquisition signal WPT_EN_AP from the enable signal WPT_EN of the near field communication controller 110.

Figure 6:
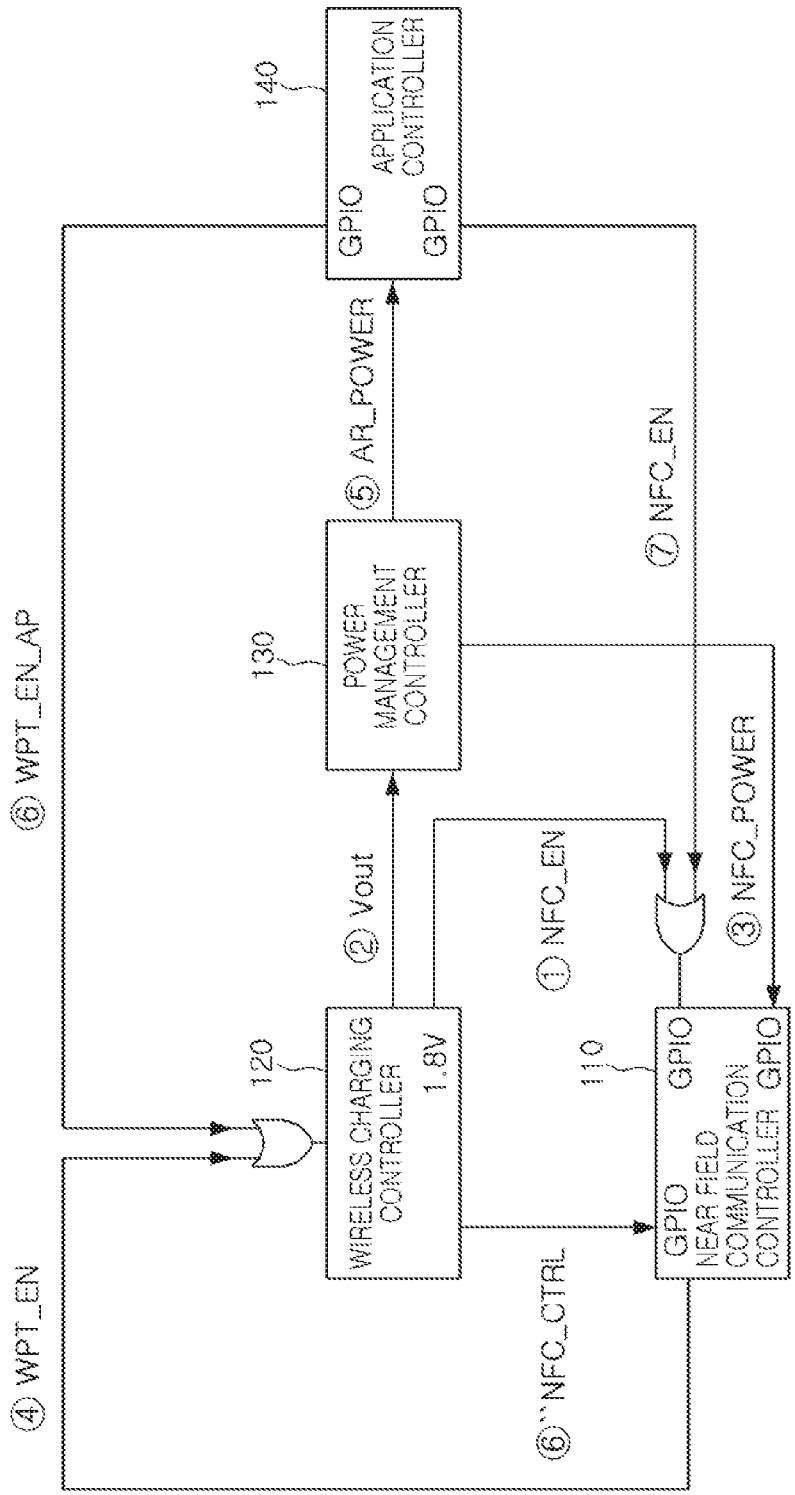
FIG. 6 is an example of a connection relationship diagram illustrating an example of a mobile terminal.

FIG. 6 shows an example in which the OR gate may be provided in front of the general purpose input output of the near field communication controller 110 and the enable signal of the wireless charging controller 120 and the enable signal of the application controller 140 are input as two inputs of the OR gate.

In the example shown in FIG. 6, one less general purpose input output may be needed than the example shown in FIG. 5.

Additionally, in the example shown in FIG. 6, the near field communication controller 110 may additionally receive a control signal NFC_CTRL to control the operation of the near field communication controller 110 from the wireless charging controller 120 through an extra general purpose input output. The control signal NFC_CTRL may be an additional signal, and if the control signal NFC_CTRL is not used, the operation of the near field communication controller 110 may be controlled according to the enable signal NFC_EN output from the wireless charging controller 120 and the enable signal NFC_EN output from the application controller 140.

Figure 7:
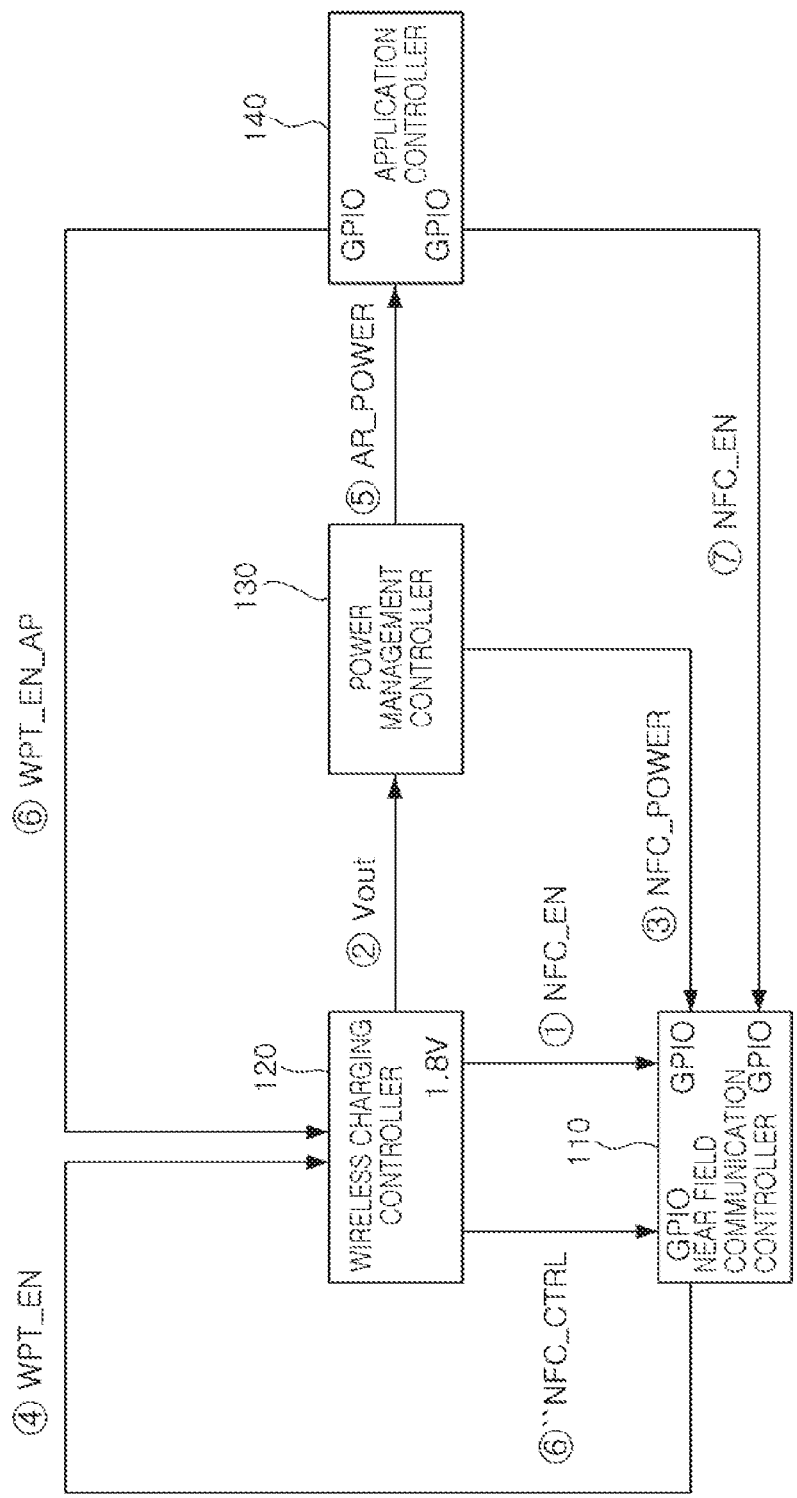
FIG. 7 is an example of a connection relationship diagram illustrating an example of a mobile terminal.

FIG. 7 shows an example in which the wireless charging controller 120 receives the enable signals from the near field communication controller 110 and the application controller 140, respectively.

In the example shown in FIG. 7, the wireless charging controller 120 may be required to individually include the general purpose input outputs. However, since the control right acquisition signal of the application controller 140 is input through the separate input port, the wireless charging controller 120 may not interpret the enable signal separately.

Figure 8:
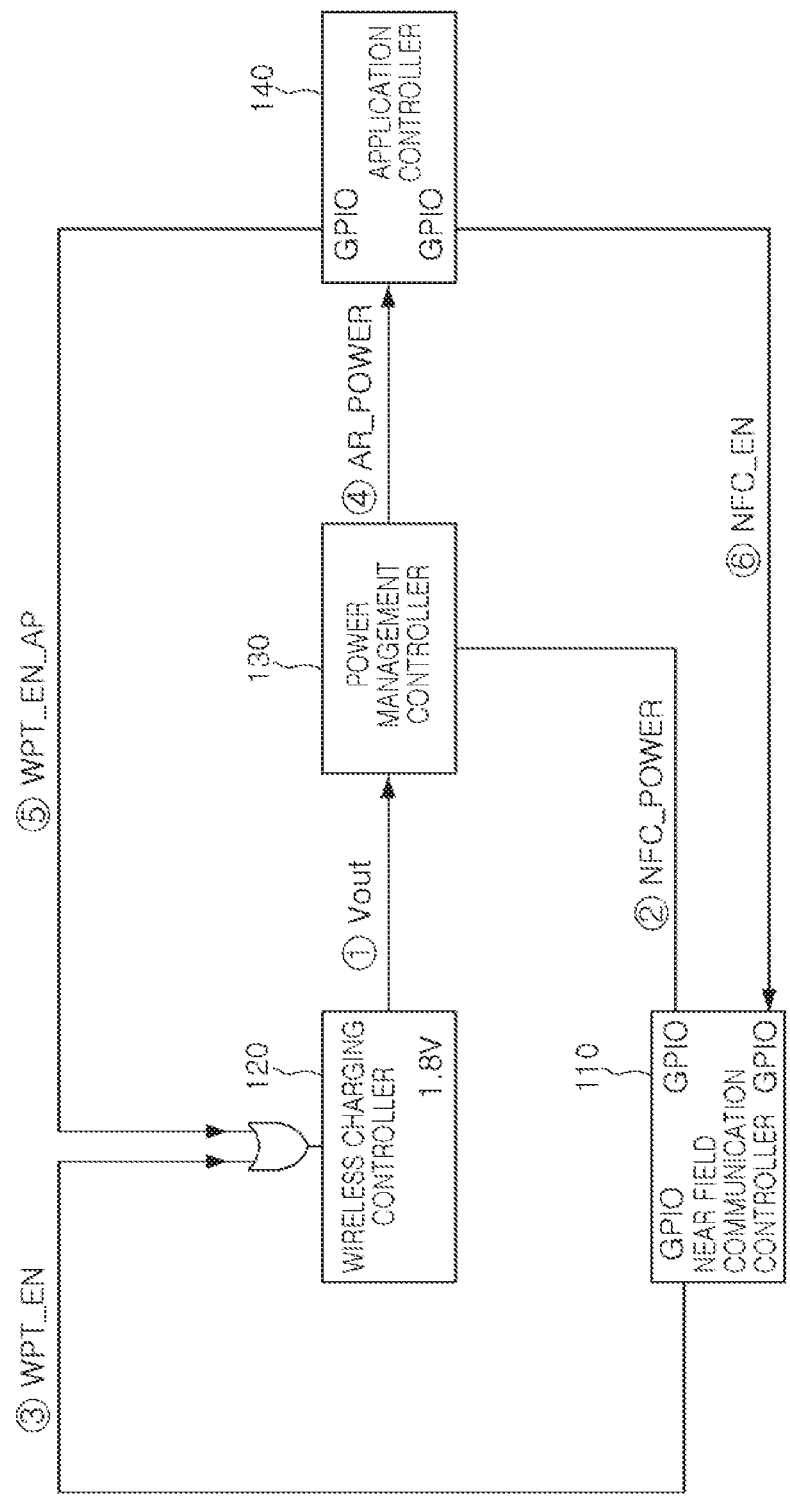
FIG. 8 is an example of a connection relationship diagram illustrating an example of a mobile terminal.

FIG. 8 shows an example in which the wireless charging controller 120 indirectly controls the near field communication controller 110 using the power management controller 130.

When receiving the wake-up power from the wireless power transfer apparatus 10, the wireless charging controller 120 may provide the wake-up power Vout to the power management controller 130.

The power management controller 130 may provide the operating power NFC_POWER to the near field communication controller 110 and provide the operating power AP_POWER to the application controller 140.

The operating power NFC_POWER that the power management controller 130 provides to the near field communication controller 110 may perform the same function as the enable signal. That is, the near field communication controller 110 may perform the reading operation for determining whether a wireless tag is present in response to the operating power NFC_POWER provided from the power management controller 130.

As described with reference to FIG. 5, the near field communication controller 110 may output to the wireless charging controller 120 the signal WPT_EN determined according to whether a wireless tag 1 is present.

Thereafter, the near field communication controller 110 may be switched to the sleep mode. Additionally, the near field communication controller 110 may be operated in response to the enable signal NFC_EN output from the application controller 140.

In addition, the wireless charging controller 120 may be operated in response to the signal WPT_EN.

In one example, if a wireless tag 1 is located in the vicinity or environment of the mobile terminal 100, the wireless charging controller 120 may stop the operation in response to the signal WPT_EN. If the wireless charging controller 120 stops operating, the power transfer operation from the wireless power transfer apparatus may stop, such that any damage to the wireless tag 1 (e.g., a card having the NFC function) by the power wirelessly transferred from the wireless power transfer apparatus 10 may be prevented.

In one example, if a wireless tag 1 is not located in the environment of the mobile terminal 100, the wireless charging controller 120 may continuously be operated in response to the signal WPT_EN.

The application controller 140 may be operated by receiving the operating power AP_POWER from the power management controller 130. That is, the application controller 140 may be woken up in response to receipt of the operating power AP_POWER from the power management controller 130.

In one example, the application controller 140 may be woken up and then control the operation of the near field communication controller 110. For example, the application controller 140 may provide an enable signal NFC_EN to the near field communication controller 110 to perform a control operation to use a wireless tag 1 that is located in the mobile environment. Alternatively, if a wireless tag is not detected and thus the wireless charging controller 120 successfully performs the wireless charging procedure, the application controller 140 may turn off the near field communication controller 110.

In one example, the application controller 140 may be woken up and then control the operation of the wireless charging controller 120. That is, if a wireless tag 1 is not detected and thus the wireless charging controller 120 successfully performs the wireless charging procedure, the application controller 140 may acquire a control right for the wireless charging and control the wireless charging with the wireless power transfer apparatus 10. For example, the application controller 140 may provide a control right acquisition signal WPT_EN_AP to the wireless charging controller 120. The control right acquisition signal WPT_EN_AP may be a signal indicating that the woken-up application controller 140 takes the control right of the wireless charging control.

If the control right acquisition signal WPT_EN_AP is input, the wireless charging controller 120 may perform the wireless charging while being operated under the dominant control of the application controller 140.

Figure 9:
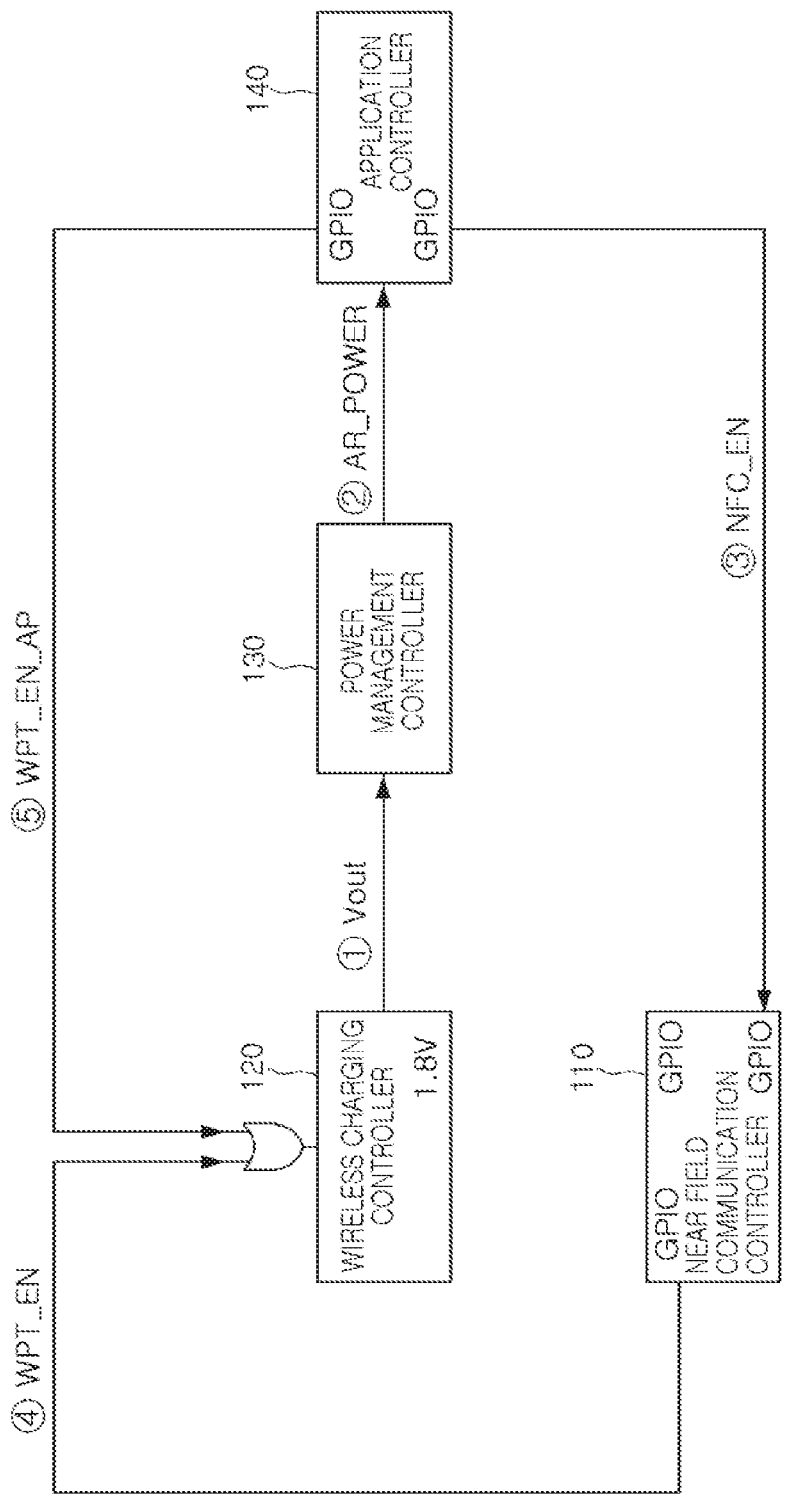
FIG. 9 is an example of a connection relationship diagram illustrating an example of mobile terminal.

FIG. 9 shows an example in which the wireless charging controller 120 indirectly controls the near field communication controller 110 using the application controller 140.

When receiving the wake-up power from the wireless power transfer apparatus 10, the wireless charging controller 120 may provide the wake-up power Vout to the power management controller 130.

The power management controller 130 may check the wake-up power Vout provided from the wireless charging controller 120 and provide the operating power AP_POWER to the application controller 140.

The application controller 140 may apply the enable signal NFC_EN to the near field communication controller 110 to operate the near field communication controller 110. That is, the near field communication controller 110 may perform the reading operation for determining whether a wireless tag 1 is present in response to the enable signal NFC_EN provided from the application controller 140. More specifically, as described with reference to FIG. 2, the power transfer may include the selection phase 210, the ping phase 230, the identification & configuration phase 230, and the power transfer phase 240.

Before the identification & configuration phase 230 for determining the identity of the mobile terminal 100 and the required power is completed, the application controller 140 may operate the near field communication controller 110 to determine whether a wireless tag 1 is present in, for example, the ping phase 220. That is, if the wireless power transfer apparatus 10 transmits the digital ping signal to the mobile terminal 100, the wireless charging controller 120, the power management controller 130, and the application controller 140 may be sequentially woken up in response to the received digital ping signal, and the near field communication controller 110 may determine whether a wireless tag 1 is present according to the signal output from the woken up application controller 140.

As described with reference to FIG. 5, the near field communication controller 110 may output to the wireless charging controller 120 the signal WPT_EN determined according to whether a wireless tag 1 is located in the mobile environment.

Thereafter, the near field communication controller 110 may be switched to the sleep mode. Additionally, the near field communication controller 110 may be operated in response to the enable signal NFC_EN output from the application controller 140.

Additionally, the wireless charging controller 120 may be operated in response to the signal WPT_EN.

In one example, if a wireless tag 1 is located in the mobile environment, the wireless charging controller 120 may stop the operation in response to the signal WPT_EN. If the wireless charging controller 120 stops operating, the power transfer operation from the wireless power transfer apparatus 10 may stop, such that any damage to the wireless tag 1 (e.g., a card having the NFC function) by the power that is wirelessly transferred from the wireless power transfer apparatus 10 may be prevented.

In one example, if a wireless tag 1 is not located in the mobile environment, the wireless charging controller 120 may continuously be operated in response to the signal WPT_EN.

The application controller 140 may be operated by receiving the operating power AP_POWER from the power management controller 130. That is, the application controller 140 may be woken up in response to the operating power AP_POWER from the power management controller 130.

Thereafter, as described with reference to FIGS. 5 and 8, the application controller 140 may control the near field communication controller 110 and/or the wireless charging controller 120.

As discussed above, as a non-limiting example, the mobile terminal 100 may include the plurality of controllers (e.g., integrated circuits for control and the like).

On the other hand, according to an example, there may be provided a communications module including at least one of the plurality of controllers (e.g., the near field communication controller and the wireless charging controller) described above. The communications module may be applied to the mobile terminal.

Figure 10A:
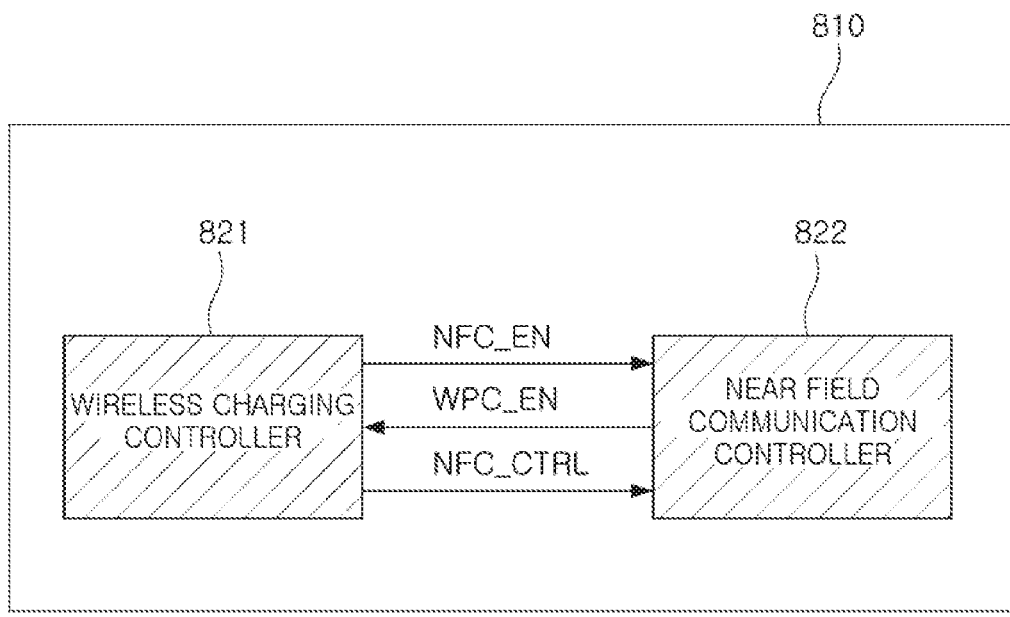
FIGS. 10A and 10B are diagrams illustrating an example of a communications module.
Figure 10B:
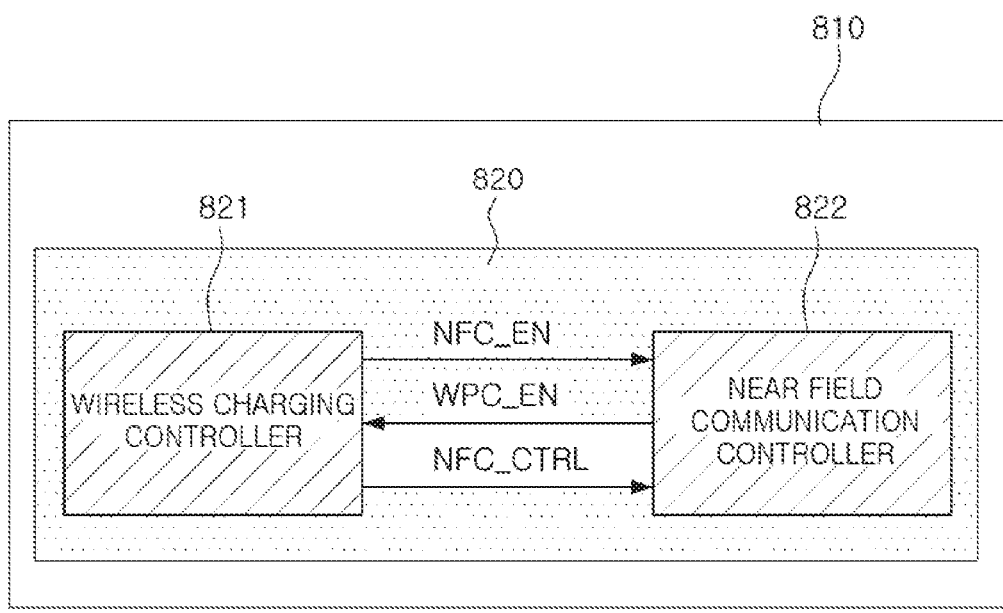

FIGS. 10A and 10B are diagrams illustrating an example of a communications module according to an example. For explanation purposes the wireless power transfer apparatus, the mobile terminal, the near field communication controller, the wireless charging controller, the power management controller, the application controller, the near field communications coil, and the power receiving coil will be discussed with reference to the wireless power transfer apparatus, the mobile terminal, the near field communication controller, the wireless charging controller, the power management controller, the application controller, the near field communications coil, and the power receiving of FIGS. 1A, 1B, and 4. Note that examples are not limited thereto.

FIGS. 10A and 10B illustrate the communications module including a module substrate 810, the near field communication controller 822 and the wireless charging controller 821.

The mobile terminal may include a communications coil and a power receiving coil, and the communications module may be applied to the mobile terminal.

A near field communication controller 822 may be electrically connected to the near field communications coil 111 of the mobile terminal 100 to recognize a wireless tag 1, and a wireless charging controller 821 may be electrically connected to the power receiving coil 121 of the mobile terminal 100 to receive power wirelessly, which is as described above.

The near field communication controller 822 and the wireless charging controller 821 may directly provide control signals to each other through a plurality of conductive lines formed between the two controllers.

Referring to FIG. 10A, the communications module may include two controllers each provided on one substrate. Specifically, the communications module may include a module substrate 810 and a wireless charging controller 821 and a near field communication controller 822 provided on the module substrate 810.

The module substrate 810 may be provided with a plurality of conductive lines connected between the wireless charging controller 821 and the near field communication controller 822, and the near field communication controller 821 and the wireless charging controller 822 may directly provide the control signals to each other through the plurality of conductive lines.

The concrete connection relationship between the wireless charging controller 821, the near field communication controller 822, and other controllers may be easily understood from the foregoing description with reference to FIGS. 5 through 9.

Referring to FIG. 10B, the communications module may include the controller module including the plurality of controllers. Specifically, the communications module may include a module substrate 810 and a controller module 820 provided on the module substrate 810.

In a non-limiting example, the controller module 820 may be implemented as a single integrated circuit in which the near field communication controller 821 and the wireless charging controller 822 may directly provide the control signals to each other through the plurality of conductive lines formed between the near field communication controller 821 and the wireless charging controller 822.

In one example, the controller module 820 may be implemented as a single integrated circuit including the wireless charging control function 821 and the near field communication control function 822. In this case, the integrated circuit groups 821 and 822 may be separately divided within one integrated circuit, and each integrated circuit group may be implemented to perform different functions.

As another example, the controller module 820 may also be implemented by providing the integrated circuits corresponding to the wireless charging controller 821 and the near field communication controller 822 on each of the integrated circuit boards, electrically connecting between these integrated circuits, and then packaging them as one package.

Although only the wireless charging controller and the near field communication controller are shown in FIGS. 10A and 10B, the power management controller and the application controller may also be implemented in a similar manner. Further, as described above, in the case where it is difficult to install the signal line directly connected between the wireless charging controller and the near field communication controller, the examples shown in FIG. 8 or 9 may be used.

In addition to the examples shown in FIGS. 10A and 10B as described above, it is apparent that various modifications may be made to implement the plurality of controllers as a single communications module. Accordingly, the communications module according to the example may not be limited to the specific examples discussed above.

Hereinafter, a control method of a mobile terminal according to an exemplary embodiment in the present disclosure will be described with reference to FIG. 11. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions.

Since the control method of the mobile terminal 100 to be described below is performed by the wireless charging controller 120 of the mobile terminal 100, it may be easily understood from the above description with reference to FIGS. 4 through 9.

Figure 11:
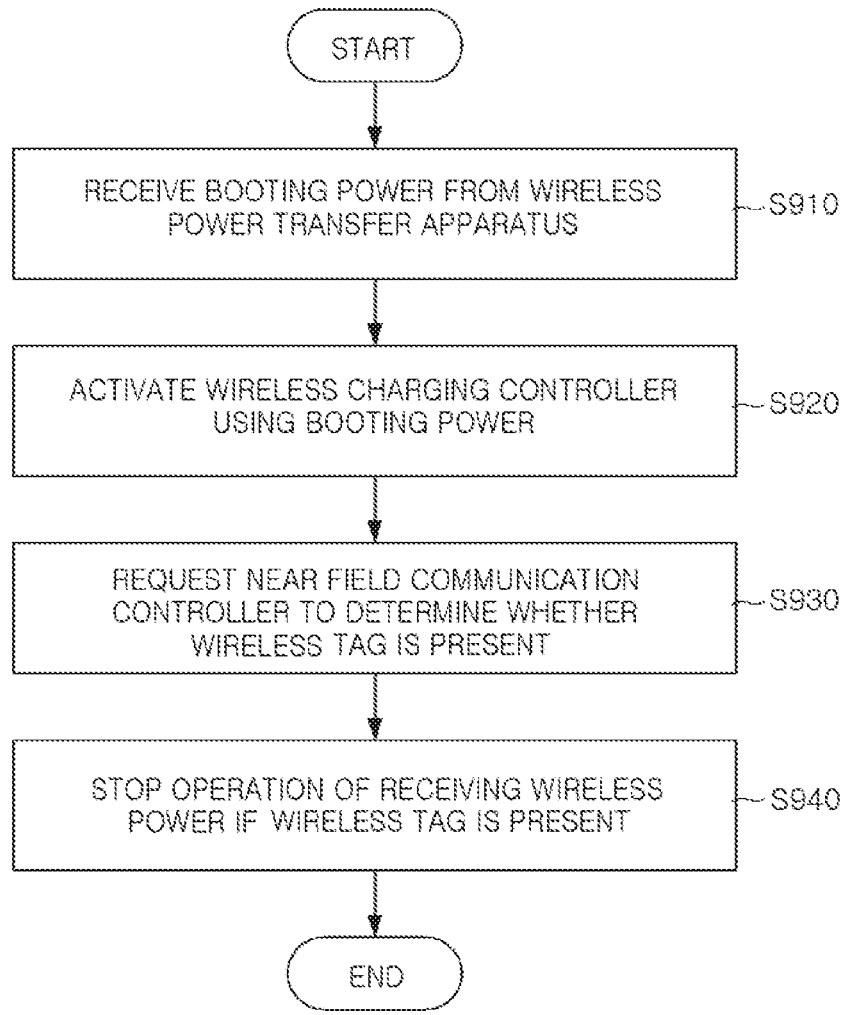
FIG. 11 is a flow chart for describing an example of a control method of a mobile terminal.

FIG. 11 is a flow chart describing a control method of a mobile terminal according to an example.

The wireless charging controller 120 may receive a wake-up power signal from the wireless power transfer apparatus 10 in operation S910.

The wireless charging controller 120 may wake up in response to receipt of the wake-up power signal in operation S920.

The wireless charging controller 120 may request the near field communication controller 110 to determine whether a wireless tag 1 is located in the mobile environment in operation S930.

If it is determined that a wireless tag 1 is located in the mobile environment from the near field communication controller 110, the wireless charging controller 120 may stop the operation for receiving the wireless power in operation S940.

If it is determined that a wireless tag is not located in the mobile environment from the near field communication controller 110, the wireless charging controller 120 may continuously perform the operation for receiving the wireless power.

In one example, continuously performing the operation of receiving the wireless power may include waking up, by the wireless charging controller 120, the application controller 140 and receiving the power transferred from the wireless power transfer apparatus 10 by interlocking or coupling with the application controller 140.

In one example, requesting the near field communication controller 120 to recognize if a wireless tag 1 is located in the mobile environment may include waking up, by the wireless charging controller 120, the power management controller 130 to supply the operating power to the near field communication controller 110 and providing, by the wireless charging controller 120, the enable signal to the input terminal of the near field communication controller 110.

In an example, requesting the near field communication controller 110 to recognize if a wireless tag 1 is located in the mobile environment may be performed by allowing the wireless charging controller 120 to directly provide the enable signal to the near field communication controller 110. Alternatively, requesting the near field communication controller 110 to determine whether the wireless tag 1 is located in the mobile environment may be performed by indirectly controlling, by the wireless charging controller 120, the near field communication controller 110 through the power management controller 130 and/or the application controller 140. For example, the wireless charging controller 120 may supply the wake-up power to the power management controller 130, the power management controller 130 may supply the operating power to the wireless communication controller 110 in response to the wake-up power, and the wireless communication controller 110 may determine whether the wireless tag 1 is present in response to the operating power. Alternatively, the wireless charging controller 120 may supply the wake-up power to the power management controller 130, the power management controller 130 may supply the operating power to the application controller 140 in response to the wake-up power, the application controller 140 may output the enable signal to the wireless communication controller 110 in response to the operating power, and the wireless communication controller 110 may determine whether the wireless tag 1 is located in the mobile environment in response to the enable signal.

As set forth above, according to the examples, the foreign objects such as the wireless tag 1 may be effectively detected before the wireless charging is performed.

In addition, according to the examples, the foreign objects such as the wireless tag 1 may be effectively detected without the support of the application controller 140 of the mobile terminal 100.

The near field communication controller 110, the wireless charging controller 120, the power management controller 130, and the application controller 140 of FIG. 4, the wireless charging controller 821 and the near field communication controller 822 of FIGS. 10A and 10B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile terminal, comprising:
a communication controller configured to detect a wireless tag in a mobile environment;

a wireless charging controller configured to receive power wirelessly, and control the communication controller to determine whether the wireless tag is in the mobile environment, in response to receiving a wake-up power signal from a wireless power transfer apparatus; and a power management controller configured to supply power to the communication controller, wherein the wireless charging controller is further configured to wake up the power management controller in response to receiving the wake-up power signal from the wireless power transfer apparatus.

2. The mobile terminal of claim 1, wherein the communication controller is further configured to control the wireless charging controller to inhibit receipt of wireless power when the wireless tag is detected.

3. The mobile terminal of claim 2, wherein the wireless charging controller comprises an input terminal configured to receive either one or both of an enable signal and an inhibit signal from the communication controller, and the communication controller is further configured to provide the inhibit signal to the input terminal in response to the wireless tag being detected.

4. The mobile terminal of claim 1, wherein the communication controller is further configured to request the wireless charging controller to receive wireless power, and terminate an operation of the communication controller in response to the wireless tag not being detected.

5. The mobile terminal of claim 1, wherein the wireless charging controller is further configured to perform a procedure for wireless power reception in response to information regarding a detection of the wireless tag not being received from the communication controller within a predetermined time.

6. The mobile terminal of claim 1, wherein the wireless charging controller is further configured to control the power management controller to provide operating power to the communication controller in response receiving the wake-up power signal from the wireless power transfer apparatus.

7. The mobile terminal of claim 1, further comprising:

an application controller configured to control an operation of either one or both of the communication controller and the wireless charging controller.

8. The mobile terminal of claim 7, wherein the wireless charging controller is further configured to control the power management controller to provide operating power to the application controller in response to receiving the wake-up power signal from the wireless power transfer apparatus.

9. The mobile terminal of claim 7, wherein the power management controller is further configured to supply operating power to the application controller and the wireless charging controller, in response to being woken up.

10. The mobile terminal of claim 1, wherein the communication controller comprises an input terminal configured to receive either one or both of an enable signal and an inhibit signal from the wireless charging controller, and the wireless charging controller is further configured to transmit the enable signal to the communication controller in response to receiving the wake-up power signal from the wireless power transfer apparatus.

11. A communications module comprising:

a module substrate;

a communication controller on the module substrate, the communication controller electrically connected to a communications coil, the communication controller being configured to detect a wireless tag;

a wireless charging controller on the module substrate, the wireless charging controller electrically connected to a power receiving coil to receive power wirelessly; and a power management controller on the module substrate, the power management controller electrically connected to the communication controller to supply power to the communication controller, wherein the communication controller and the wireless charging controller are configured to provide control signals to each other through conductive lines formed between the communication controller and the wireless charging controller, and wherein the wireless charging controller is further configured to wake up the power management controller in response to receiving a wake-up power signal from a wireless power transfer apparatus.

12. A control method of a mobile terminal performed by a wireless charging controller, the method comprising:

receiving wake-up power signal from a wireless power transfer apparatus;

waking up a power management controller, which is configured to supply power to a communication controller, in response to the receiving of the wake-up power signal; and requesting that the communication controller, which is configured to detect a wireless tag in an environment of the mobile terminal and is included in the mobile terminal, determine whether the wireless tag is in the environment of the mobile terminal.

13. The control method of claim 12, further comprising:

inhibiting an operation of receiving wireless power in response to the communication controller determining that the wireless tag is in the environment of the mobile terminal.

14. The control method of claim 12, further comprising:

continuing an operation of receiving wireless power in response to the communication controller determining that the wireless tag is not in the environment of the mobile terminal.

15. The control method of claim 14, wherein the continuing of the operation of receiving the wireless power comprises:

waking up an application controller located in the mobile terminal; and receiving power transferred from the wireless power transfer apparatus by performing a coupling operation with the application controller.

16. A mobile terminal, comprising:

a communication controller configured to recognize a wireless tag based on signals from a communications coil;

a wireless charging controller configured to receive power wirelessly from a wireless power transfer apparatus via a power receiving coil, and output a wired wake-up power signal in response to receiving a wireless wake-up power signal from the wireless power transfer apparatus; and an auxiliary controller configured to control the communication controller to determine whether the wireless tag is located in an environment of the mobile terminal in response to receiving the wired wake-up power signal from the wireless charging controller, the auxiliary controller further configured to supply power to the communication controller, wherein the wireless charging controller is configured to wake up the auxiliary controller in response to receiving the wireless wake-up power signal from the wireless power transfer apparatus.

17. The mobile terminal of claim 16, wherein
the wireless wake-up power signal is a digital ping signal, and
the auxiliary controller is further configured to control the communication controller to determine whether the wireless tag is in the environment of the mobile terminal before the wireless power transfer apparatus determines an identity of the mobile terminal and a required power demand for the mobile terminal.

18. The mobile terminal of claim 16, wherein the auxiliary controller comprises:
a power management controller configured to receive the wired wake-up power signal and output a first operating power and a second operating power; and
an application controller configured to operate in response to receiving the first operating power,
wherein the communication controller is further configured to detect whether the wireless tag is in an environment of the mobile terminal, in response to the second operating power.

19. The mobile terminal of claim 16, wherein the auxiliary controller comprises:
a power management controller configured to receive the wired wake-up power signal and output a first operating power; and
an application controller configured to operate in response to receiving the first operating power,
wherein the application controller is configured to output an enable signal in response to the first operating power, and the communication controller is configured to detect whether the wireless tag is in an environment of the mobile terminal in response to the enable signal.

* * * * *